March 7, 1961  W. J. BOBEAR ET AL  2,974,063
COMPOSITE TAPES
Filed Nov. 19, 1958
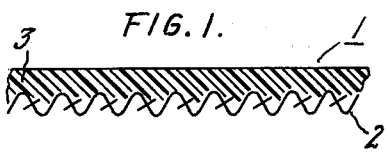
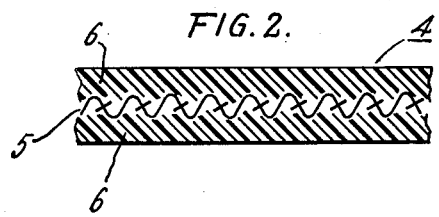
INVENTORS
WILLIAM J. BOBEAR
KARL W. KRANTZ
BY
THEIR ATTORNEY United States Patent Office 2,974,063
Patented Mar. 7, 1961

2,974,063
COMPOSITE TAPES

William J. Bobear, Latham, and Karl W. Krantz, Schenectady, N.Y., assignors to General Electric Company, a corporation of New York Filed Nov. 19, 1958, Ser. No. 774,983

6 Claims. (Cl. 117—76)

This invention relates to tapes and to processes for making tapes. More particularly, the invention relates to composite tapes of organopolysiloxanes and glass or other fabric which are characterized by improved physical and electrical properties.

Composite tapes comprising organopolysiloxane and glass or other fabric are well known. Normally, glass fabric is supplied with a starch-oil sizing or primer which serves as a lubricant in the manufacture of the glass threads and fabrics. Such sizes are not normally compatible with organopolysiloxanes. While the glass fabric can be heat-cleaned to remove the lubricant and other sizes applied which are more or less compatible with organopolysiloxanes, it has been found that tapes so made have been deficient in electrical and physical qualities.

A principal object of this invention is to provide composite organopolysiloxane-fabric tapes which have improved physical and electrical characteristics.

Briefly stated, the invention comprises composite organopolysiloxane-fabric tapes in which a water soluble primer comprising the heat reaction product of vinyl alkoxy silanes and ethylene glycol is applied to the fabric, such as glass, before the application of the organopolysiloxane thereto.

Those features of the invention which are believed to be patentable are set forth in the claims appended hereto. The invention, however, together with further advantages and uses thereof will be better understood from a consideration of the following description and the drawing in which Fig. 1 is a longitudinal cross-sectional view of one type of tape produced according to this invention while Fig. 2 shows a longitudinal cross-sectional view of another type of tape which may be prepared according to this invention.

The primers or sizes of the invention are very readily prepared. Generally speaking, silanes containing as an essential ingredient a vinyl trialkoxy silane, such as vinyl triethoxy silane, are reacted at below 100° C. in the amount of one mol for each 2½ mols or more of ethylene glycol to produce a suitable primer material, the monohydric alcohol formed being removed during the process. Preferably, from about 3 to 6 mols of ethylene glycol are used per mol of silane, it being realized that the excess ethylene glycol must be evaporated off eventually, although greater amounts of ethylene glycol than those indicated may be used if desired. Furthermore, in order to obtain the desirable results of the invention, at least 10 mol percent of the silane must be vinyl triethoxy silane with the rest such materials as methyltrichlorosilane, methyltriethoxysilane, ethyltrichlorosilane, dimethyldichlorosilane, etc.

In order that the final primer may be water soluble, the silanes should contain preponderantly silicone-bonded methyl or ethyl radicals as opposed to aromatic radicals of which latter up to about 5 mol percent may be tolerated.

The alkoxy silane is advantageously obtained by effecting reaction between individual lower alkyl hydrolyzable silanes (capable of reacting with a monohydric alcohol to make the alkoxysilanes) and a monohydric alcohol or a mixture of lower alkyl hydrolyzable silanes and a monohydric alcohol. The hydrolyzable silanes used to make the alkoxysilanes may be chlorosilanes, for instance, alkylchlorosilanes. A particular range of ingredients of this type which may advantageously be employed is found described in the following table.

TABLE I

| Ingredient | Molar Concentration |
|---|---|
| RSiCl$_3$ | 50 to 100 (preferably 50 to 98) mol percent. |
| (CH$_3$)$_3$SiCl | 0 to 50 mol percent. |
| (CH$_3$)$_2$SiCl$_2$ | 0 to 10 mol percent. |
| SiCl$_4$ | 0 to 10 mol percent. | where R is a lower radical selected from the class consisting of methyl and ethyl radicals, or a vinyl radical and mixtures thereof.

The monohydric alcohol used to make the mixture of alkyl alkoxysilanes may be any one having the general formula R'OH where R' is an alkyl radical containing from 1 to 5 carbon atoms, preferably from 2 to 4 carbon atoms. Among such alcohols may be mentioned methanol, ethanol, propanol, isopropanol, butanol, isobutanol, amyl alcohol, etc. Although methanol or ethanol may be employed, generally it is found that, due to the volatility of these alcohols, and the ease of their undesirable side reaction with HCl, more precautions have to be observed in making the alkoxysilanes. Although alcohols higher than the butanols can be employed, nevertheless those of higher chain length introduce undesirable odor and questions of toxicity. Monohydric alcohols containing, e.g., 8 or more carbon atoms in general, react too sluggishly to be of value. For optimum ease in the manufacture of the alkoxysilanes, it is desirable that the alcohol used be such that the alkoxy silane obtained from the alcohol have a boiling point above 100° C. so that in its reaction with the dihydric alcohol, there would be less danger of undesirable volatilization loss of reaction product. It has been found that the monohydric alcohol containing some dissolved HCl, which is recovered in the distillation step hereinafter described, is suitable for use in future alkoxylation reaction, either in a batch process or on a continuous recycle process.

The molar ratio of the monohydric alcohol to the chlorosilane (or mixture of chlorosilanes) should be such that there is present one mol of monohydric alcohol per silicon-bonded chlorine atom. However, advantageously one may employ from 0.5 to 2 mols of the monohydric alcohol per silicon-bonded chlorine atom, since, in addition to the silicon-bonded alkoxy groups, minor amounts of non-alkoxylated silicon-bonded chlorine atoms attached to silicon can be tolerated and may be economically advantageous. When the chlorosilane is predominantly alkyltrichlorosilane, about 0.5 mol of the monohydric alcohol per silicon-bonded chlorine atom is the smallest ratio which will avoid gel formation when the dihydric alcohol is added. If desired, there may be a substantial excess of the number of mols of monohydric alcohol per chlorine atom, up to the economic limit which will be readily apparent to those skilled in the art. Within the limits described above, it will be apparent that the alkylsilane may also contain silicon-bonded chlorine atoms.

The manner of preparing the alkoxysilanes is relatively simple. It is only necessary to mix together the alkylchlorosilane or mixture of alkylchlorosilanes and the monohydric alcohol with the liberation of HCl. This interaction is effected with stirring and although no heat is necessary, gentle heating may be desirable under some circumstances. The reaction product comprising the alkyl alkoxysilane or mixture of alkyl alkoxysilanes will be saturated with HCl to the extent of solubility of the system depending on the temperature at which the reaction is conducted and on the final temperature. Generally, it may be desirable to remove most of this dissolved HCl by gentle heating, for instance, at temperatures of about 50 to 100° C. However, a small amount of the HCl in the alkoxysilane mixture has been found desirable in order to accelerate the reaction between the alkoxysilane and the ethylene glycol. In general, the amount of HCl required for this purpose is of the order of from about 0.1 percent to the point of saturation, based on the total weight of the alkyl alkoxysilanes. Optimum range is of the order of about 1 to 10 percent, by weight, HCl based on the weight of alkoxysilanes in the solution. Instead of employing HCl in the alkoxysilane reactant where the HCl is derived from the reaction between the chlorosilane and the monohydric alcohol, one can add preformed HCl or other suitable acidic catalysts prior to removal of the monohydric alcohol.

The ethylene glycol used for the purposes recited above, in addition to being low in cost and being readily removable from the condensed organopolysiloxane in the ultimate use wherein the latter will be employed, has also the unique property of imparting water solubility to the reaction product of the latter and the alkoxysilane. It was found that unexpectedly the use of an analogous material such as propylene glycol yielded water-insoluble products under equivalent conditions. For optimum water solubility, it is essential that for each alkoxy group present in the mixture of alkyl alkoxysilanes, one must employ in excess of one hydroxy group of the ethylene glycol. For optimum results, including ease of condensation of the ethylene glycol reaction product to the ultimate organopolysiloxane state, and for improved water repellency and water solubility, it is desirable to employ for each equivalent of silicon-bonded alkoxy radical, ethylene glycol equivalent to at least 1.5 carbon-bonded hydroxyl groups. Thus, one could advantageously use at least 0.67 gram mol ethylene glycol for each gram equivalent of silicon-bonded alkoxy radical.

The alkyl alkoxysilane or alkyl alkoxysilanes and the ethylene glycol are mixed together and heated under vacuum at a temperature below 100° C. to volatilize the liberated monohydric alcohol and to sweep the hydrogen chloride out of the system to a point where essentially all of the alkoxy groups derived from the monohydric alcohol are removed. Although it is desirable that all such latter alkoxy groups be removed in this reaction between the alkyl alkoxysilane and ethylene glycol, in certain instances it is possible to tolerate up to 5 percent silicon-bonded alkoxy radicals which have not been reacted with the ethylene glycol although preferably it is desirable that essentially all of these alkoxy radicals be removed and substituted by reaction with the ethylene glycol.

The reduced pressure used in this stage of the reaction should be sufficient to remove essentially all the released monohydric alcohol, although traces of the latter in the reaction mixture can be tolerated without undesirable results. It is essential that the temperature during reaction between the alkoxysilanes and the ethylene glycol should be maintained below 100° C. if one is to obtain complete water solubility. Thus, if the temperature is raised above 100° C., water insolubility will be the result, thereby giving a product which is different from the benzene-insoluble, water-soluble products of the present invention and thus of little utility.

After interaction between the alkyl alkoxysilane or mixture of alkyl alkoxysilanes and the ethylene glycol, all traces of residual HCl not removed or swept out of the system should be neutralized, for instance, by use of finely divided calcium carbonate. The products thus obtained are low viscosity liquids ranging in viscosity from about 10 to 200 centipoises when measured at 25° C. These fluids are stable for long periods of time at temperatures ranging from 25 to 50° C. This is advantageous because the composition as such can be stored for long periods of time or can be transported over long distances at temperatures as high as 40 to 50° C.

The following examples will illustrate the preparation of the primer or sizing material of the invention, it being realized that such examples are merely illustrative in nature and not limiting in any way.

*Example 1*

A mixture of 180.6 grams (0.95 mol) vinyltriethoxysilane and 7.5 grams (0.05 mol) of methyltrichlorosilane was added over a period of 10 minutes to 9.0 grams of violently agitated isopropyl alcohol in a suitable container. To the resultant acidic reaction mixture, 186 grams (3.0 mols) of ethylene glycol were added over a period of ten minutes. The system was then arranged for vacuum stripping under water aspiration, the stripping being continued until the container temperature reached 100° C. The resultant homogeneous solution was then neutralized with calcium carbonate, mixed with finely divided silica and fuller's earth and filtered to produce 192 grams of final product which was then adjusted with respect to acidity by the addition of acetic acid up to a concentration of 0.5 percent by weight, based on the weight of the resin.

*Example 2*

Example 1 above was repeated in every respect except that the silane used consisted entirely of vinyl triethoxysilane.

*Example 3*

Example 1 was repeated except that the silanes used were in the amount of 50 mol percent vinyltriethoxysilane and 50 mol percent methyltrichlorosilane.

*Example 4*

Example 1 was repeated except that the silanes were used in the amount of 50 mol percent vinyltriethoxysilane and 50 mol percent dimethyldichlorosilane.

*Example 5*

Example 1 was repeated except that the silane mixture used consisted of 10 mol percent vinyltriethoxysilane and 90 mol percent methyltrichlorosilane.

The convertible organopolysiloxanes used in connection with this invention may be viscous masses or gummy solids depending upon the state of condensation of the starting organopolysiloxanes polymerizing agent, etc. and will hereinafter for convenience be referred to as "convertible organopolysiloxanes." Although the convertible organopolysiloxanes used in the present invention are well known in the art, attention is directed to the convertible organopolysiloxanes disclosed in Agnes Patent 2,448,756 and Sprung et al. Patent 2,448,556, the latter two patents being issued September 7, 1948; Sprung Patent 2,484,595, issued October 11, 1949; Krieble et al. Patent 2,457,688, issued December 28, 1948; Marsden Patent 2,521,528, issued September 5, 1950—all the foregoing patents being assigned to the same assignee as the present invention; Hyde Patent 2,490,357, issued December 5, 1949; and Warrick Patent 2,541,137, issued February 13, 1951. Also applicable to the present invention are the organopolysiloxanes set forth in application Serial No. 680,438, filed August 26, 1957, and assigned to the same assignee as this invention. This application is included herein by reference.

It will, of course, be understood by those skilled in the art that other convertible organopolysiloxanes containing the same or different silicon-bonded organic substituents (e.g., methyl, ethyl, propyl, vinyl, allyl, phenyl, tolyl, xylyl, phenylethyl, naphthyl, chlorophenyl, both methyl and phenyl, etc. radicals) connected to the silicon atoms by carbon-silicon linkages, may be employed in the present invention without departing from the scope of this invention. The particular convertible organopolysiloxane used is not critical and may be any one of those described in the foregoing patents generally obtained by condensation of a liquid organopolysiloxane containing an average of from about 1.95, preferably from about 1.98 to about 2.05 organic groups per silicon atom. The polymerizing agents which may be employed are well known in the art and may include, for instance, ferric chloride hexahydrate, phenyl phosphoryl chloride; alkaline condensing agents, such as potassium hydroxide, sodium hydroxide, etc. Each convertible organopolysiloxane generally comprises a polymeric diorganosiloxane which may contain, if desired, for example, up to 2 mol percent copolymerized monoorganosiloxane, for example, copolymerized monomethylsiloxane and a small molar (e.g., less than 1 mol) percent of triorganosiloxy units, e.g., trimethylsiloxy units. Generally, we prefer to use as the starting liquid organopolysiloxanes (or mixtures of organopolysiloxanes) from which the convertible, for example, heat-convertible organopolysiloxanes are prepared, ones which contain about 1.999 to 2.01, inclusive, organic groups, for example, methyl groups per silicon atom, and where preferably more than 50 percent, e.g., more than 75 percent, of the silicon atoms in the polysiloxane contain two silicon-bonded lower alkyl groups. The convertible organopolysiloxane thus prepared also advantageously contains silicon atoms to which at least 50 percent of the hydrocarbon groups attached thereto are lower alkyl radicals, e.g., methyl radicals.

The starting organopolysiloxanes used to make the convertible organopolysiloxanes advantageously comprise organic constituents consisting essentially of monovalent organic radicals attached to silicon by carbon-silicon linkages, and in which essentially all the siloxane units consist of units of the structural formula $R_2SiO$, where R is preferably a radical of the group consisting of methyl and phenyl radicals. At least 50 to 75 percent of the total number of R groups are preferably methyl radicals. The polysiloxane may be one in which all the siloxane units are $(CH_3)_2SiO$, or the siloxane may be a copolymer of dimethylsiloxane with a minor amount (e.g., from 1 to 20 or more mol percent) of any of the following units, alone or in combination therewith: $C_6H_5(CH_3)SiO$ and $(C_6H_5)_2SiO$. The presence of halogen, e.g., chlorine, atoms on the phenyl nucleus is not precluded.

Where alkenyl groups are attached to silicon by carbon-silicon linkages, it is preferable that the alkenyl groups (for instance, vinyl groups, allyl groups, etc.) be present in an amount equal to from 0.05 to 2 mol percent of the total number of silicon-bonded organic groups in the convertible organopolysiloxane.

The fillers used in the invention include finely divided silica fillers, many of which are free of hydroxyl groups either in the form of adsorbed moisture or of silicon-bonded hydroxyl groups, depending on the method by which they are prepared. Under some conditions of manufacture, these structure-inducing fillers may contain hydroxyl groups, for instance, hydroxyl groups bonded directly to silicon of the silica molecule, but due to modification of such silicas, for instance, by the introduction of silicon-bonded alkoxy groups in place of some of the silicon-bonded hydroxyl groups, increased structure and knit times result when these types of silica fillers are incorporated in convertible organopolysiloxanes. These silica fillers are reinforcing fillers in contrast to other fillers of the non-reinforcing and usually non-structure-forming type, such as titanium dioxide, lithopone, calcium carbonate, etc. Examples of such silica fillers may be found described in U.S. Patents 2,541,137; 2,610,167 and 2,657,149. Such fillers may be slightly acidic or alkaline (i.e., have pH's below or above 7) depending upon the method of manufacture, and may be obtained through an aerosol-aerogel process, by fuming processes such as by the vapor phase burning of silicon tetrachloride or ethyl silicate, etc.

The amount of filler used in combination with the convertible organopolysiloxane may obviously be varied within wide limits, for instance, from about 10 to 300 percent, by weight, of the filler based on the weight of the convertible organopolysiloxane. The exact amount of filler used will depend upon such factors as, for instance, the application for which the convertible organopolysiloxane is intended, the type of filler employed (e.g., density of the filler), the type of convertible organopolysiloxane employed, etc. Examples of other fillers which may be incorporated in combination with the above fillers may be, for instance, titanium dioxide, lithopone, zinc oxide, zirconium silicate, iron oxide, calcium carbonate, etc.

Various curing agents to effect more rapid conversion of the convertible organopolysiloxane to the cured, solid, elastic state may be incorporated. Among such curing agents may be mentioned, for instance, benzoyl peroxide, tertiary butyl perbenzoate, bis-(2,4-dichlorobenzoyl) peroxide, etc. These curing agents (or "vulcanization accelerators" as they are often designated) may be present in amounts ranging from about 0.1 to as high as 4 to 8 percent or more, by weight, based on the weight of the convertible organopolysiloxane. High energy electron irradiation without curing agents may also be employed for vulcanizing purposes.

Particularly useful in connection with the present invention are those filled organopolysiloxanes described in copending application Serial No. 680,438, filed August 26, 1957, and assigned to the same assignee as this invention, said application being included herein by reference. Briefly, this application describes convertible organopolysiloxanes filled with material such as finely divided silica, which produced a structure condition in which a structure reducing additive comprising an organic carbonate material in an amount equal to from about 0.05 to 10 percent, by weight, based on the weight of the convertible organopolysiloxane is utilized.

In the preparation of the tapes of this invention, heat cleaned glass fabric cloth or other fabric such as composite fabric of glass, synthetic materials such as polyethyleneterephthalate and the like are coated with the primer or sizing material described above. Such coating may be accomplished by brushing the primer on the cloth, by spraying or by simply passing the cloth through the solution of the primer or in any other convenient way which will occur to those skilled in the art. The cloth is then dried, for example a glass cloth is conveniently baked for about 10 minutes at 150° C. and then for about 10 minutes at 250° C. while synthetic containing cloths are heated at correspondingly lower temperatures which they will withstand. For example, cloth containing polyethylene glycol terephthalate could be heated to about 225° C. under the above conditions. It will be realized, of course, that the drying process is of a time temperature nature, practically any drying cycle being used depending upon the time afforded so long as the material or primer is thoroughly dried. After the primer coat has been dried, a filled organopolysiloxane gum of the desired composition with curing agent and other materials such as process aids or silicone compound may be applied to the tape as by spraying, dipping, brushing, calendering and the like, the organopolysiloxane being applied to either one or both sides of the glass or other fabric as desired, the organopolysiloxane being then cured in place by the process indicated for the particular material. Shown in Fig. 1 is a typical tape which may be made according to the present invention. The tape 1 is comprised of a glass fabric 2 through one side of which there is applied an organopolysiloxane layer 3. Shown in Fig. 2 is another glass tape 4 in which the glass fabric 5 is coated on either side with an organopolysiloxane material 3.

The following examples will illustrate the preparation of tapes in accordance with the present invention.

Example 6

Heat-cleaned glass cloth was dipped in a 10 percent water solution of the primer of Example 1, air dried, and baked for 10 minutes at 150° C. followed by a ten-minute bake at 250° C. There was applied to the primed glass fabric by calendering a methyl vinylpolysiloxane gum or methyl vinyl gum prepared by reacting octamethylcyclotetrasiloxane and tetramethyltetravinylcyclotetrasiloxane in such proportions that the final polysiloxane gum contained about 0.2 mol percent vinyl groups on the polysiloxane chain with 0.001 percent, by weight, KOH at a temperature of about 140° C. to 150° C. for four or five hours. One hundred parts, by weight, of this material were doughmixed at 110° C.–115° C. for one hour with 3 parts, by weight, diethylene glycol bis-(2-n-butoxyethyl carbonate) and 40 parts, by weight, silica filler. There was mixed in after doughmixing 2 parts, by weight, iron oxide filler and 2 parts, by weight, benzoyl peroxide. The methyl vinyl compound so prepared was soluble in benzene and had an average of about 2 methyl groups per silicon atom. Two tapes so prepared were then placed back to front and press cured for about 10 to 15 minutes at a temperature of 150° C. under contact pressure. When one inch wide strips were peeled apart on a Scott tester, using a pull of 2" per minute, the bond strength results expressed to the pounds of pull per linear inch of width of the sample was 13 p./i. and the failure was of the cohesive type, that is, the failure was in the organopolysiloxane material itself as opposed to a failure between the organopolysiloxane and the glass fabric. When the primer solution used was 20 percent by weight in water, the bond strength was 16 p./i. with the failure again being cohesive and a primer concentration of 30 percent by weight primer in water, the bond strength was again 16 p./i. and the failure of the cohesive type.

Example 7

Example 6 was repeated except the primer used was that of Example 3 prepared from 50 mol percent vinyltriethoxysilane and 50 mol percent methyltrichlorosilane. The bond strength of a tape prepared as in Example 6 above using these materials was 16.5 p./i. with a cohesive type failure.

Example 8

Example 6 was repeated except that the primer used was that described in Example 4 as being made, using 50 mol percent vinyl triethoxy silane and 50 mol percent dimethyl dichlorosilane. When a tape prepared with this primer was tested on a Scott tester as above, the bond strength was 16.7 p./i. with a cohesive type failure.

Example 9

Example 6 was repeated except that the material used had a primer like that of Example 2 above in which 100 mol percent or the entire silane content of the primer was vinyltriethoxysilane. When a tape so prepared according to the directions of Example 6 was tested, the bond strength was proved to be 17.4 p./i. with a cohesive type failure in the organopolysiloxane itself.

Example 10

A tape was prepared using as a base heat cleaned glass fabric having a primer of a 10 percent solution in toluene of a methylphenyl compound prepared by mixing together, by weight, 100 parts methyl phenyl gum, 65 parts iron oxide, 25 parts diatomaceous earth and 1.9 parts benzoyl peroxide. There was then applied to the primed glass fabric by calendering more of the methyl phenyl gum as such, as opposed to the solution. When a tape prepared as in Example 6 was tested on the Scott tester, the bond strength was 7.4 pounds per inch and the type failure was cohesive. On the other hand, when instead of priming the glass fabric with the methylphenyl gum, a 10 percent solution of the primer of Example 1 was used, the bond strength of the tape so prepared was 13.5 pounds per inch and the type failure was cohesive.

The electrical characteristics of the products of the present invention are very favorable. There were prepared test samples of the vinyl organopolysiloxane of Examples 6 through 9 in the form of 40 mil thick slabs, 6" square. There were also prepared samples of Example 7 of the present invention consisting of laminates, 5 mils thick and 6" square. When the samples were tested for electric strength, using ¼" gasketed electrodes at 0.5 kv. per second, after conditioning the samples for respectively 48 hours at 23° C., 50 percent relative humidity, for 96 hours at 23° C. at 96 percent relative humidity, for 168 hours at 250° C., and for 48 hours at 200° C., the results were as shown in Table II below. It will be noted that the electric strength of the present laminated materials compare very favorably with the silicone rubber material itself. The 60 cycle power factor and dielectric constant for these samples were determined under the same conditions as above, using a Schering bridge at 500 volts, the results being shown once more in Table II as comparing quite favorably with those of the rubber itself. The volume resistivity (ohm/centimeter), measured on Keithley electrometer at 500 volts D.C., is also shown in Table II.

TABLE II

| Conditions, Hrs./Temp. °C./Rel. Humidity | Electric Strength (Average) (volts/mil.) | | Percent P. F. | | Dielectric Constant | | Volume Resistivity (ohm-cm.) | |
|---|---|---|---|---|---|---|---|---|
| | Rubber | Laminate | Rubber | Laminate | Rubber | Laminate | Rubber | Laminate |
| 48/23/59 | 558 | 594 | .15 | .19 | 2.9 | 3.4 | $1.6 \times 10^{16}$ | $1.9 \times 10^{16}$ |
| 96/23/96 | 572 | 494 | .24 | .58 | 2.9 | 3.5 | $4.1 \times 10^{16}$ | $4.4 \times 10^{15}$ |
| 168/250 | 667 | 636 | .07 | .06 | 3.1 | 3.5 | $2.8 \times 10^{16}$ | $1.8 \times 10^{16}$ |
| 48/200 | 456 | 467 | .47 | .73 | 2.6 | 2.7 | $7.8 \times 10^{12}$ | $4.6 \times 10^{12}$ |

The advantages of the present invention are further illustrated by voltage endurance tests in which our new materials provide a superior product. In these tests tapes were prepared using the new glass primer of Example 3 and a prior art rubber primer of a 10% solution of material made from, by weight, 100 parts methyl siloxane gum, 50 parts calcium carbonate, 5 parts ethyl silicate along with one percent of benzoyl peroxide as a curing agent. The latter primer was heated for 5 minutes at 150° C. after application in the usual manner and then at 250° C. for 10 minutes to cure the primer. In each case the silicone rubber was calendered on both sides of the glass cloth to give a tape about 20 mils thick. One such rubber (C) was like that of Example 6 above. Another rubber (B) was similar except that there was employed also, by weight, 2 parts diphenylsilanediol as a process aid while the amount of benzoyl peroxide was reduced to 1.5 parts and the organic carbonate used was diethyl carbonate. A third rubber (A) was similar to rubber (B) except that no carbonate was used and 3 parts of dimethyldiethoxysilane were used in the mix. Samples of coated glass cloth six inches square primed with each of the two primers were plied up and cured under contact pressure for 20 minutes at 140° C. and then post cured for 1 hour at 300° F. and 4 hours at 400° F. giving a thickness of 0.120 inch. In the testing, which was in air, the voltage was held at 200 volts per mil (VPM) for 200 hours and then gradually raised to 285 VPM over a period of about 250 hours. It was then held at 285 VPM for about 90 hours. Five samples were tested in each case. Severe corona attack occurred when the voltage was raised from 200 VPM. During the testing not one of the samples primed according to this invention failed regardless of whether the overcoating was that of rubber A, B or C. On the other hand 4 out of 5 samples having rubber primed glass as above and a coating of rubber compound A failed. With rubber primed glass and rubber B as an overcoating 2 out of 5 samples failed as did rubber primed glass having an overcoating of rubber C above.

What we claim as new and desire to secure by Letters Patent of the United States is:

1. A composite tape comprising (1) a glass-containing cloth, (2) a heat cured primer for (1) comprising a monohydric alcohol-free residue of the reaction at temperatures below 100° C. of ethylene glycol and a material consisting essentially of a vinyl trialkoxysilane having alkoxy groups containing from 1 to 5 carbon atoms and where there is utilized in said reaction at least 2½ moles of ethylene glycol per mole of said material and (3) a coating for the primed cloth comprising an organopolysiloxane convertible to the cured, solid, elastic state, said organopolysiloxane containing an average of from 1.95 to 2.05 organic groups per silicon atom attached to silicon through carbon-silicon linkages, said organic groups being selected from the class consisting of methyl, vinyl, and phenyl radicals, at least 50% of said organic groups being methyl radicals.

2. A composite tape in accordance with claim 1, having a cured coating for said primed cloth.

3. A composite tape comprising (1) a glass-containing cloth, (2) a heat cured primer for (1) comprising a monohydric alcohol-free residue of the reaction at temperatures below 100° C. of ethylene glycol and a material consisting essentially of a vinyl trialkoxysilane having alkoxy groups containing from 1 to 5 carbon atoms, where there is utilized in said reaction at least 2½ moles of ethylene glycol per mole of said material and (3) a coating for the primed cloth comprising a filler, a curing agent and an organopolysiloxane convertible to the cured, solid, elastic state, said organopolysiloxane containing an average of from 1.95 to 2.05 organic groups per silicon atom attached to silicon through carbon-silicon linkages.

4. A composite tape comprising (1) a glass cloth, (2) a heat cured primer for (1) comprising a monohydric alcohol-free residue of the reaction at temperatures below 100° C. of ethylene glycol and a material consisting essentially of a vinyl trialkoxysilane having alkoxy groups containing from 1 to 5 carbon atoms, where there is utilized in said reaction at least 2½ moles of ethylene glycol per mole of said material and (3) a coating for the primed cloth comprising a curing agent, an organic carbonate, a filler and an organopolysiloxane convertible to the cured, solid, elastic state, said organopolysiloxane containing an average of from 1.95 to 2.05 organic groups per silicon atom attached to silicon through carbon-silicon linkages, from 0.05 to 2 mole percent of said organic groups being vinyl groups.

5. The composite tape of claim 3, in which the organic carbonate is diethylene bis-(2-n-butoxyethyl) carbonate.

6. A composite tape comprising (1) a glass cloth, (2) a heat cured primer for (1) comprising the monohydric alcohol-free residue of the reaction at temperatures below 100° C. of ethylene glycol and vinyl triethoxysilane, where there is utilized in said reaction at least 2½ moles of ethylene glycol per mole of said vinyl triethoxysilane and (3) a coating for the primed cloth comprising a curing agent, a filler, diethylene bis-(2-n-butoxyethyl) carbonate and an organopolysiloxane convertible to the cured, solid, elastic state, said organopolysiloxane containing an average of from 1.95 to 2.05 organic groups per silicon atom attached to silicon through carbon-silicon linkages, from 0.05 to 2 mole percent of said organic groups being vinyl groups.

References Cited in the file of this patent

UNITED STATES PATENTS

| | | |
|---|---|---|
| 2,680,124 | Brooks et al. | June 1, 1954 |
| 2,715,135 | Brooks et al. | Aug. 9, 1955 |
| 2,754,237 | Brooks | July 10, 1956 |
| 2,816,348 | Adamik | Dec. 17, 1957 |
| 2,827,099 | Youngs | Mar. 18, 1958 |
| 2,887,467 | Krantz | May 19, 1959 |
| 2,916,461 | Krantz | Dec. 8, 1959 |